United States Patent
Rosthauser et al.

[19]

[11] Patent Number: 6,140,381
[45] Date of Patent: Oct. 31, 2000

[54] DELAYED ACTION CATALYSTS FOR CARPET BACKING AND AIR FROTHED FOAM

[75] Inventors: James W. Rosthauser, Pittsburgh, Pa.; Hartmut Nefzger, New Martinsville; Robert L. Cline, Paden City, both of W. Va.; Gerard C. Erhart, Glenshaw, Pa.

[73] Assignee: Bayer Corporation, Pittsburgh, Pa.

[21] Appl. No.: 09/326,831

[22] Filed: Jun. 7, 1999

Related U.S. Application Data

[63] Continuation-in-part of application No. 09/203,875, Dec. 2, 1998, abandoned.

[51] Int. Cl.$^7$ .................................................. C08G 18/08
[52] U.S. Cl. .......................... 521/126; 521/127; 521/155; 156/78; 427/385.5; 427/389.9
[58] Field of Search ..................................... 521/126, 127, 521/155; 427/385.5, 389.9; 156/78

[56] References Cited

U.S. PATENT DOCUMENTS

| | | |
|---|---|---|
| 3,523,103 | 8/1970 | Zemlin . |
| 3,565,860 | 2/1971 | Pande . |
| 3,772,224 | 11/1973 | Marlin et al. . |
| 3,813,424 | 5/1974 | Hayashi et al. . |
| 3,849,156 | 11/1974 | Marlin et al. . |
| 4,087,412 | 5/1978 | Groves . |
| 4,549,945 | 10/1985 | Lindstrom . |
| 5,145,976 | 9/1992 | Nichols et al. ............................ 556/88 |
| 5,149,844 | 9/1992 | Nichols et al. ............................ 556/89 |
| 5,155,248 | 10/1992 | Ullrich et al. ............................ 556/90 |
| 5,356,529 | 10/1994 | Eswarakrishnan et al. ............. 205/224 |
| 5,462,766 | 10/1995 | Markusch et al. ....................... 427/244 |
| 5,491,174 | 2/1996 | Grier et al. ............................... 521/127 |
| 5,558,917 | 9/1996 | Markusch et al. ........................ 428/95 |
| 5,646,195 | 7/1997 | Mobley .................................... 521/121 |
| 5,714,562 | 2/1998 | Rosthauser et al. ...................... 528/58 |
| 5,744,568 | 4/1998 | Kosaka et al. ............................ 528/58 |
| 5,859,165 | 1/1999 | Bossert et al. ............................ 528/58 |

*Primary Examiner*—John M. Cooney, Jr.
*Attorney, Agent, or Firm*—Joseph C. Gil; N. Denise Brown

[57] ABSTRACT

This invention relates to a process for the production of a polyurethane backing and air frothed foam on a substrate comprising the steps of a) mixing a polyisocyanate and a polyol blend in the presence of a catalyst to form a reaction mixture, b) applying the reaction mixture to a substrate, and c) curing the reaction mixture to form a polyurethane backing an/or an air frothed foam on the substrate. Suitable catalyst compositions for the present invention include those corresponding to the formula:

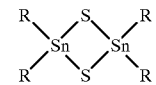

wherein:
each R: independently represents a linear or branched $C_1$ to $C_{24}$ (preferably from 5 to 16 carbon atoms and most preferably from 8 to 12 carbon atoms) alkyl group, or a cyclic group containing from 4 to 24 carbon atoms (preferably from 5 to 16 carbon atoms and most preferably from 8 to 12 carbon atoms).

19 Claims, No Drawings

0;

DELAYED ACTION CATALYSTS FOR CARPET BACKING AND AIR FROTHED FOAM

RELATED APPLICATIONS

This application is a continuation-in-part of U.S. application Ser. No. 09/203,875 filed on Dec. 2, 1998 which is now abandoned.

BACKGROUND OF THE INVENTION

This invention relates to a process for the production of a polyurethane backing or air frothed foam on a substrate comprising the steps of a) mixing a polyisocyanate and a polyol blend in the presence of a catalyst to form a reaction mixture, b) applying the reaction mixture to a substrate, and c) curing the reaction mixture to form a polyurethane backing or air frothed foam on the substrate. This process requires specific catalyst compositions which are alkyl substituted organotin compounds containing sulfur bridging groups.

Many polyurethane applications use catalysts which are heat activated so that mixtures of the co-reactants have long potlives at room temperature, but react almost immediately when heated to a temperature above the catalyst activation temperature. Current state-of-the-art delayed action catalysts include mercury catalysts, bismuth catalysts, and amine catalysts blocked with carboxylic acids. Each of these groups of catalysts has disadvantages associated with their use. Mercury based catalysts are poisonous and, thus, serious health risks are associated with their use. Catalysts based on bismuth are water sensitive and deactivate in the presence of moisture. Accordingly, these catalysts are not suitable for any application in which water is present or added. The acid-blocked amine catalysts have an unpleasant odor associated with their use, especially when the polyurethane mixtures are cured in an oven at temperatures above 250° F. This unpleasant odor also remains in the final product, making these catalysts unsuitable for some applications.

Other known delayed action catalysts include various tin-sulfur catalysts such as, for example, tin mercaptoacetates, tin mercaptides and tin sulfides. Of these, the tin mercaptoacetates are known to be sensitive to both acids and to water, which limits their usefulness to application areas which are free from acids and water. The tin mercaptides show some delayed action, but the activation temperature is too low to be of much use commercially. Both the tin mercaptoacetates and the tin mercaptides are more reactive at room temperature than is typically desirable for delayed action catalysts. Finally, the tin-sulfides have an unpleasant odor associated with their use. The unpleasant odor of these catalysts make these unpopular delayed action catalysts also.

U.S. Pat. No. 3,813,424 discloses a process for the manufacture of dialkytin oxide. This process comprises reacting alkyl iodide directly with metallic tin to form dialkytin iodide, followed by hydrolysis to the form corresponding dialkyltin oxide. Dialkyltin oxides are effective urethane catalysts, but do not have the delayed action feature desired in many applications.

Light stable elastomers and a process for their production are disclosed by U.S. Pat. No. 5,714,562. These elastomers comprise the reaction product of an isocyanate prepolymer, a chain extender and a catalyst selected from i) solid delayed action catalysts having a melting point of greater than about 60° C., ii) alkyl substituted organotin catalysts containing alkylmercaptide ligands which are liquid at room temperature, and iii) alkyl substituted organotin catalysts containing sulfur bridging groups which are liquid at room temperature. Light stable elastomers are based on aliphatic diisocyanates, the reactivity profile of which is quite different from the more widely used aromatic polyisocyanates. Due to the much lower reactivity of aliphatic vs. aromatic isocyanates, it is much easier to make heat activated systems based on aliphatic isocyanates.

Various organotin catalyst compositions are disclosed in U.S. Pat. No. 5,646,195. This patent describes delayed action dialkyltin sulfide catalysts that are useful in carpet backing applications. The delay in gellation due to these dialkyltin sulfide catalysts provides improved handling and backing quality.

Processes for the production of polyurethane carpet backing, various polyisocyanates and catalysts for these processes are described in U.S. Pat. Nos. 5,462,766 and 5,558,917. The process of U.S. Pat. No. 5,462,766 forms a polyurethane by the reaction of an isocyanate and a polyol mixture wherein the isocyanate is based on polymethylene poly(phenylisocyanate) and has a monomer content of less than 55%, a 2,2'- and 2,4'-diphenylmethane diisocyanate content of less than 3%, a functionality of less than 2.5, an isocyanate group content of 25 to 30% and a urethane group content of about 2 to 6%. Suitable catalysts for this process include organometallic catalysts and tertiary amines, particularly those which are heat activated. Organonickel catalysts were used in the examples of U.S. Pat. No. 5,558,917.

These organonickel catalysts have long been known to the carpet backing industry. U.S. Pat. Nos. 3,772,224 and 3,849,156 describe their use specifically in polyurethane carpet backing formulations. However, the amount of catalysts used in these formulations is relatively high, usually from 0.5 to 3.0% by weight, based on the total weight of the polyol mixture used to form the polyurethane.

The process disclosed by U.S. Pat. No. 5,558,917 forms a polyurethane from the reaction of a polyisocyanate and a polyol wherein the polyisocyanate is characterized as having a functionality of less than about 2.4, an isocyanate group content of 25 to 30% and a urethane group content of from about 2 to 6%. This polyisocyanate is based on polymethylene poly(phenylisocyanate) and comprises from about 5 to 25% of 4,4'-diphenylmethane diisocyanate, and from about 20 to 50% of 2,2'-diphenylmethane diisocyanate. Suitable catalysts include tertiary amines, and organometallic catalysts such as, nickel acetylacetonate as in the examples.

The present invention has many advantages over the existing art. The catalysts of the present invention are used in relatively low amounts from about 0.01 to 0.5% by weight, based on the total weight of the polyol blend. The activation temperature is sufficiently high so that premature cure is reduced. The catalysts do not generate odors in the process steps or in the resulting products. Also, these catalysts maintain their activity in the presence of moisture. All of these improvements are especially advantageous in the production of carpet backing and frothed foam products.

SUMMARY OF THE INVENTION

This invention relates to a process for the production of a polyurethane backing on a substrate comprising the steps of a) mixing a polyisocyanate and a polyol blend in the presence of a catalyst, and optionally, a blowing agent that preferably comprises water, to form a reaction mixture, wherein the catalyst corresponds to the general structure:

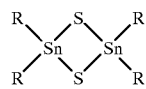

wherein:
each R: independently represents a linear or branched $C_1$ to $C_{24}$ (preferably from $C_5$ to $C_{16}$ and most preferably from $C_8$ to $C_{12}$) alkyl group, or a cyclic group containing from 4 to 24 carbon atoms (preferably from 5 to 12 carbon atoms and most preferably from 6 to 8 carbon atoms), b) applying the reaction mixture to a substrate, and c) curing the reaction mixture to form a polyurethane backing or an air frothed foam on the substrate.

The catalysts of the present invention are particularly suited to the processing conditions used to produce carpet and frothed foam carpet cushions. The catalyst can be used in relatively low amounts. These catalysts also provide long pot lives (i.e., puddle times) which are necessary to provide a smooth surface when the polyurethane forming compositions are gauged using a doctor bar. They do not lose their catalytic activity in the presence of water. In addition, these catalysts provide sufficient catalysis when the compositions are heated in the curing oven. They also have the advantage of not generating objectionable odors.

DETAILED DESCRIPTION OF THE INVENTION

Suitable catalysts for the present invention include those catalyst compositions corresponding to the formula:

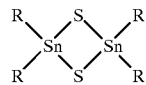

wherein:
each R: independently represents a linear or branched $C_1$ to $C_{24}$ (preferably a $C_5$ to $C_{16}$, and most preferably a $C_8$ to $C_{12}$) alkyl group, or a cyclic group containing from 4 to 24 carbon atoms (preferably from 5 to 12 carbon atoms and most preferably from 6 to 8 carbon atoms);

Some examples of the catalyst compositions for the presently claimed process of producing a polyurethane backing or an air frothed foam on a substrate include, but are not limited to, 2,2,4,4-tetrakis(methyl)-1,3,2,4-dithiadistannetane; 2,2,4,4-tetrakis(ethyl)-1,3,2,4-dithiadistannetane; 2,2,4,4-tetrakis(1-propyl)-1,3,2,4-dithiadistannetane; 2,2,4,4-tetrakis(2-propyl)-1,3,2,4-dithiadistannetane; 2,2,4,4-tetrakis(1-butyl)-1,3,2,4-dithiadistannetane; 2,2,4,4-tetrakis(2-butyl)-1,3,2,4-dithiadistannetane; 2,2,4,4-tetrakis(tert-butyl)-1,3,2,4-dithiadistannetane; 2,2,4,4-tetrakis(1-pentyl)-1,3,2,4-dithiadistannetane; 2,2,4,4-tetrakis(1-hexyl)-1,3,2,4-dithiadistannetane; 2,2,4,4-tetrakis(1-heptyl)-1,3,2,4-dithiadistannetane; 2,2,4,4-tetrakis(1-octyl)-1,3,2,4-dithiadistannetane; 2,2,4,4-tetrakis(2-ethylhexyl)-1,3,2,4-dithiastannetane; 2,2,4,4-tetrakis(1-nonyl)-1,3,2,4-dithiadistannetane; 2,2,4,4-tetrakis(1-dodecyl)-1,3,2,4-dithiadistannetane; 2,2,4,4-tetrakis(1-tridecyl)-1,3,2,4-dithiadistannetane; 2,2,4,4-tetrakis(1-tetradecyl)-1,3,2,4-dithiadistannetane; 2,2,4,4-tetrakis(1-pentadecyl)-1,3,2,4-dithiadistannetane; 2,2,4,4-tetrakis(1-hexadecyl)-1,3,2,4-dithiadistannetane; 2,2,4,4-tetrakis(1-octadecyl)-1,3,2,4-dithiadistannetane; 2,2,4,4-tetrakis(cyclopentyl)-1,3,2,4-dithiadistannetane; 2,2,4,4-tetrakis(cyclohexyl)-1,3,2,4-dithiadistannetane; 2,2,4,4-tetrakis(cyclo-octyl)1,3,2,4-dithiadistannetane; etc.; and mixtures thereof. In a preferred embodiment of the present process, the catalyst compositions correspond to formula (I) above wherein each R independently represents a linear or branched alkyl group having from 5 to 16 carbon atoms, or a cyclic group containing from 5 to 16 carbon atoms. Suitable examples of such catalyst compositions include, but are not limited to, 2,2,4,4-tetrakis(1-pentyl)-1,3,2,4-dithiadistannetane; 2,2,4,4-tetrakis(1-hexyl)-1,3,2,4-dithiadistannetane; 2,2,4,4-tetrakis(2-ethyl-1-hexyl)-1,3,2,4-dithiastannetane; 2,2,4,4-tetrakis(1-heptyl)-1,3,2,4-dithiadistannetane; 2,2,4,4-tetrakis(1-octyl)-1,3,2,4-dithiadistannetane; 2,2,4,4-tetrakis(1-nonyl)-1,3,2,4-dithiadistannetane; 2,2,4,4-tetrakis(1-dodecyl)-1,3,2,4-dithiadistannetane; 2,2,4,4-tetrakis(1-tridecyl)-1,3,2,4-dithiadistannetane; 2,2,4,4-tetrakis(1-tetradecyl)-1,3,2,4-dithiadis-tannetane; 2,2,4,4-tetrakis(1-pentadecyl)-1,3,2,4-dithiadistannetane; 2,2,4,4-tetrakis(1-hexadecyl)-1,3,2,4-dithiadistannetane; 2,2,4,4-tetrakis (cyclopentyl)-1,3,2,4-dithiadistannetane; 2,2,4,4-tetrakis (cyclo-hexyl)-1,3,2,4-dithiadistannetane; 2,2,4,4-tetrakis (cyclo-octyl)1,3,2,4-dithiadistannetane; etc.; and mixtures thereof.

Most preferred catalysts for the present invention are 2,2,4,4-tetrakis(methyl)-1,3,2,4-dithiadistannetane; 2,2,4,4-tetrakis(1-butyl)-1,3,2,4-dithiadistannetane; 2,2,4,4-tetrakis (1-octyl)-1,3,2,4-dithiadistannetane; 2,2,4,4-tetrakis(1-dodecyl)-1,3,2,4-dithiadistannetane; and 2,2,4,4-tetrakis (cyclohexyl)-1,3,2,4-dithiadistannetane.

Suitable catalysts for the present invention may be prepared by, for example, the process as described in commonly assigned U.S. Pat. No. 6,020,283 issued on Feb. 1, 2000, the disclosure of which is herein incorporated by reference. This process comprises reacting a dialkyltin dihalide with an alkali metal sulfide, in the presence of polar solvents.

In commercial processes used to prepare methylene bis (phenylisocyanate), mixtures of the aniline/formaldehyde condensation products are phosgenated and then the monomeric two ring adducts are at least partially removed from the polymethylene poly(phenylisocyanate) mixture, most commonly by distillation. By varying the processing conditions, the ratio of aniline to formaldehyde, and the level and type of acid catalyst used for the condensation, mixtures of the various two ring isomers, i.e., the 2,2'-, 2,4'-, and 4,4'-methylene bis(phenylamine), and the various positional isomers of the higher ring polyamine oligomers can be controlled. Thus, the phosgenated mixture can be tailored to be enriched in the relative amounts of monomeric two ring diisocyanates compared to higher ring polyisocyanates. In this manner, it is also possible to obtain mixtures that contain a relatively high amount of the less reactive ortho-substituted two ring and higher ring polyisocyanates. Mixtures of the 4,4'-, 2,4'-, and 2,2'-methylene bis (phenylisocyanate) monomers that are enriched in the 2,4'- and 2,2'-isomer can also be separated from these phosgenated mixtures by distillation. Alternatively, mixtures of the two ring diisocyanates and higher ring polyisocyanates can be produced directly having desirable viscosity, isomer ratio, and reactivity characteristics. By higher ring polyisocyanates, it is meant three-ring or higher products derived by the phosgenation of aniline-formaldehyde condensation products. These are also commonly known as polymeric MDI, and may be referred to as derivatives of MDI. Polymeric MDI is suitable for use in the present invention, however, it is advantageous to incorporate groups that improve compatibility.

Suitable polyisocyanates for the process of the present invention include those polyisocyanates based on polymethylene poly(phenylisocyanate) having a functionality of less than about 2.5, an isocyanate group content of about 25 to 30%, and a urethane group content of about 2 to 6%. As used herein, the urethane group content is defined as:

$$\% \text{ urethane} = \frac{59 \times (\text{OH equivalents}) \times 100}{\text{total weight}}$$

Suitable polymethylene, poly(phenylisocyanate) compositions are those wherein the total monomer content is up to about 75% by weight. Of the monomer content, from about 5 to about 55% by weight is the 4,4'-isomer of MDI, and up to about 50% by weight is the 2,2'- and 2,4'-isomers of MDI. These isocyanates generally have a viscosity of less than 500 mPa.s at 25° C. One of ordinary skill in the art knows that there are several ways to prepare the suitable isocyanates for the presently claimed process.

It is possible to prepare these isocyanates, for example, by mixing polymethylene poly(phenylisocyanate) with additional monomeric methylene bis(phenylisocyanate), followed by the addition of a mixture containing at least one low molecular weight organic compound having an average functionality of from 1.0 to 3.0, preferably 1.5 to 2.5, most preferably from 1.8 to 2.2, and being selected from the group consisting of monoalcohols, diols, and triols. Tripropylene glycol, dipropylene glycol, and mixtures thereof are preferred low molecular weight compounds to be used in the preparation of the isocyanate mixture. Alternately, one can make the isocyanate directly from a polymethylene poly(phenylisocyanate) that already contains a relatively high level of monomer (e.g., 50 to 70%) due to its method of manufacture. In cases where the average functionality of polymeric MDI is already >2.5, it is preferred to use mixtures of monoalcohols and diols/triols to reduce the average functionality of the product.

Suitable low molecular weight organic compounds to be used in preparing the isocyanate as described hereinabove include those compounds having a molecular weight of less than 500, and an average functionality of from 1.0 to 3.0, preferably 1.5 to 2.5, and most preferably 1.8 to 2.2. These compounds are carefully selected from the group consisting of monoalcohols, diols, triols, and mixtures thereof so that the resulting modified polymeric isocyanates are homogeneous liquids at room temperature. Some examples of suitable compounds include, for example, glycols such as, for example, ethylene glycol, propylene glycol, 1,3-propane diol, 1,4-butanediol, 1,6-hexamethylene glycol, dipropylene glycol, tripropylene glycol, diethylene glycol, triethylene glycol, tetraethylene glycol, tetrapropylene glycol, heptapropylene glycol, neopentyl glycol, 2,2,4-trimethyl-1,5-pentanediol, etc. These also include compounds such as, for example, cyclohexane-dimethanol and the various bisphenols. Suitable monoalcohols include compounds such as, for example, methanol, ethanol, 1-propanol, 2-propanol, 1-butanol, 2-butanol, 1-pentanol, 2-ethylhexanol, dodecanol, etc. It is most preferred to use a technical mixture of tri-/di-propylene glycol.

These isocyanates may also be prepared, for example, by blending a polymethylene poly(phenylisocyanate) mixture with a polyisocyanate adduct, wherein the adduct is the reaction product of monomeric methylene bis(phenyleneisocyanate) with at least one low molecular weight organic compound having an average functionality of 1.0 to 3.0, preferably 1.5 to 2.5, and most preferably 1.8 to 2.2, and being selected from the group consisting of monoalcohols, diols, and triols previously described. Preferred low molecular weight compounds include tripropylene glycol and technical mixtures thereof with dipropylene glycol.

A preferred polyisocyanate is based on polymethylene poly(phenylisocyanate) and has a monomer content of less than 55%, a 2,2'- and 4,4'-methylene bis(phenylisocyanate) content of less than 3%, a functionality of less than 2.5, an isocyanate group content of 25 to 30%, and a urethane group content of from about 2 to 6%.

Another preferred polyisocyanate component for the present invention comprises polymethylene poly(phenylisocyanate) having a functionality of less than about 2.4, an isocyanate group content of 25 to 30%, and a urethane group content of from about 2 to 6%. This preferred polymethylene poly(phenylisocyanate) of the present invention comprises from about 5 to 25% of 4,4'-methylene bis(phenylisocyanate), and from about 20 to 50% of 2,2'- and 2,4'-methylene bis(phenylisocyanate).

Another polyisocyanate that is particularly preferred for the present invention comprises (2) an isocyanate having an average isocyanate functionality of about 2.4, an isocyanate content of about 27.3%, containing about 46% monomeric 4,4'-MDI, about 1% monomeric 2,4'- and 2,2'-MDI isomers, about 28% higher ring homologues of the MDI series, and the remainder being the adduct of 4,4'-MDI with tripropylene glycol such that the urethane group concentration of the mixture is about 4.2%. The viscosity of the mixture is about 300 mPa.s at room temperature. The mixture is prepared by mixing 50 parts of a 133 equivalent weight polymeric isocyanate mixture having an average functionality of about 2.8 and a 2,4'- and 2,2'-MDI isomer concentration of about 2% with 50 parts of a 182 equivalent weight prepolymer prepared by reacting 4,4'-MDI with tripropylene glycol.

Particularly preferred polyisocyanates for the process of the present invention include, for example, (1) an isocyanate having an average isocyanate functionality of about 2.15, an isocyanate content of about 27.5%, containing about 48% monomeric 4,4'-MDI, about 10% monomeric 2,2'- and 2,4'-MDI isomers, about 18% higher ring homologues of the MDI series, and the remainder being the adduct of 4,4'-MDI with tripropylene glycol such that the urethane group concentration of the mixture is about 4.2%. The viscosity of the mixture is about 140 mPa.s at room temperature. The mixture was prepared by mixing 50 parts of a 130 equivalent weight polymeric isocyanate mixture having an average functionality of about 2.3, a 4,4'-MDI isomer concentration of about 45%, and a 2,2'- and 2,4'-MDI isomer concentration of about 19% with 50 parts of a 182 equivalent weight prepolymer prepared by reacting 4,4'-MDI with tripropylene glycol.

Suitable polyols for use in the polyol mixture of the present invention include those organic compounds having molecular weights of from 500 to 10,000 and containing from 1 to 12 isocyanate-reactive hydrogen atoms. These compounds include, for example, polyethers, polyesters, polythioethers, polyacetals, polycarbonates, and amine terminated polyethers of the type known for the production of polyurethanes. Preferred compounds include the polyethers containing from 1.5 to 4.0, preferably 2.0 to 3.0 isocyanate-reactive groups, and having molecular weights of from 500 to 8,000, more preferably of from 800 to 6,000.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include, for example, the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Another class of polyols are "copolymer polyols", which are base polyols containing stable dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

Suitable examples of high molecular weight polyesters include, for example, the reaction products of polyhydric, preferably dihydric alcohols (optionally, in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be substituted, for example, by halogen atoms, and/or unsaturated. The polycarboxylic acids and polyols used to prepare the polyesters are known and described for example in U.S. Pat. Nos. 4,940,750, 4,098,731 and 3,726,952, herein incorporated by reference in their entirety. The following are disclosed as suitable examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as, for example, oleic acid, and dimethyl terephthalate and mixed terephthalates. Suitable dihydric alcohols include ethylene glycol, 1,3- and 1,2-propylene glycol; 1,4-, 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones, for example, ε-caprolactone or hydroxycarboxylic acids, for example, ω-hydroxycaproic acid, may also be used.

Suitable polythioethers; polyacetals, polycarbonates and other polyhydroxyl compounds are also disclosed in the above-identified U.S. patents. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable low molecular weight chain extenders to be used in the polyol mixture include organic compounds having a molecular weight of less than 500, and an average functionality of from 1.0 to 3.0, preferably 1.5 to 2.5, and most preferably 1.8 to 2.2. These compounds are selected from the group consisting of monoalcohols, diols, triols, and mixtures thereof. Some examples of suitable compounds include, for example, glycols such as, for example, ethylene glycol, propylene glycol, 1,2- and 1,3-propane diol, 1,3- and 1,4- and 2,3-butanediol, 1,6-hexanediol, dipropylene glycol (DPG), tripropylene glycol (TPG), diethylene glycol (DEG), triethylene glycol (TEG), tetraethylene glycol, tetrapropylene glycol, heptapropylene glycol, 2-methyl-1,3-propanediol, 1,10-decanediol, neopentyl glycol, and 2,2,4-trimethylpentane-1,3-diol, etc. Suitable monoalcohols include compounds such as, for example, methanol, ethanol, 1-propanol, 2-propanol, n-butanol, 1-pentanol, 2-ethyl-1-hexanol, stearyl alcohol, and alkyl substituted phenols containing from 1 to 22 carbon atoms in the alkyl group such as, for example, nonylphenol. Preferred chain extenders include DEG, TEG, DPG, TPG and mixtures thereof.

It is also possible to include additives, fillers, etc. in the polyol mixture of the present invention. Some examples of suitable additives include, but are not limited to, silicon foam stabilizing agents, wetting agents such as, for example, ethoxylated nonphenol, etc. Useful fillers to be included in the reaction mixture include materials such as, for example, calcium carbonate, alumina trihydrate, recycled calcium carbonate, recycled alumina trihydrate, fly ash, recycled tire crumb, barium sulfate, etc.

In preparing polyurethane-backed substrates or air frothed foams according to the invention, the individual components of the polyurethane-forming composition or air frothed foam composition are mixed and applied as a layer of preferably uniform thickness onto one surface of the substrate. Suitable substrates are described below. Coated release papers known in the art are preferred substrates for the air frothed foams to be applied to.

It is often preferred to pre-mix all components except the isocyanate (and blowing agent when the system is frothed) to form a formulated "B-side". When water is used as a blowing agent, it is pre-mixed with the polyol component to form a formulated "B-side". When water is the blowing agent, it is typically present in amounts such that there is from 0.1 to 4%, preferably from 0.2 to 3%, and more preferably from 0.5 to 2% by weight of water, based on the total weight of the polyol component. This simplifies the metering and mixing of components at the time the polyurethane-forming composition is prepared. In preparing a frothed polyurethane backing, it is preferred to mix all components and then blend a gas into the mixture, using equipment such as an Oakes mixer or Firestone foamer.

The compositions described hereinabove have been found to be particularly effective in producing polyurethane backing and/or air frothed foams for floorings and, especially, for carpets when used with the polyol mixture described hereinabove. Other possible applications include roofing membranes, sound dampening foams, foam shoe inlays, energy absorbing foams, carpet padding, etc.

Other suitable substrates for the polyurethane produced from the presently claimed process include, for example, but are not limited to jute, synthetic jute, non-woven fibers, especially non-woven polypropylene fiber, treated or non-treated release papers. These substrates can be coated with the polyurethane backing in order to produce roofing membranes or polyurethane carpet padding, which is installed prior to cushion backed or non-backed carpet. In addition, a substrate such as one mentioned above can be coated with an air frothed foam according to the invention, and the coated side of the substrate can then be protected from prematurely attaching to surfaces or to itself by covering it with coated release paper as is known in the art. These substrates are then attached to the surfaces by placing the coated side of the substrate in the desired position on the surface and then exerting pressure on the uncoated side of the substrate.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples of this invention:

Isocyanate A: an isocyanate having an average isocyanate functionality of about 2.15, an isocyanate content of about 27.5%, containing about 48% monomeric 4,4'-MDI, about 10% monomeric 2,2'- and 2,4'-MDI isomers, about 18% higher ring homologues of the MDI series, and the remainder being the adduct of 4,4'-MDI with tripropylene glycol such that the urethane group concentration of the mixture was about 4.2%. The viscosity of the mixture was about 140 mPa.s at room temperature. The mixture was prepared by mixing 50 parts of a 130 equivalent weight polymeric isocyanate mixture having an average functionality of about 2.3, a 4,4'-MDI isomer concentration of about 45%, and a 2,2'- and 2,4'-MDI isomer concentration of about 19% with 50 parts of a 182 equivalent weight prepolymer prepared by reacting 4,4'-MDI with tripropylene glycol.

Catalyst A: a nickel acetylacetonate catalyst, commercially available from Witco as NIAX LC-5615

Catalyst B: 2,2,4,4-tetrakis(1-butyl)-1,3,2,4-dithiadistannetane

Catalyst C: 2,2,4,4-tetrakis(1-octyl)-1,3,2,4-dithiadistannetane

Catalyst D: 2,2,4,4-tetrakis(1-dodecyl)-1,3,2,4-dithiadistannetane

Catalyst E: dibutyltin dilaurate; commercially available as Dabco T-12 from Air Products The polyol blend used in the working examples was as follows:

Arco Atlantis Q-1000 Resin: a polyether polyol blend containing diethylene glycol, and having an OH number of about 117, commercially available from Arco Chemicals Various pbw of each catalyst was added to Polyol Blend A as set forth in Table 1, and tested under the following conditions:

Procedure for Pot Life

The pot life data was determined by mixing the polyol (about 140 grams) and the isocyanate (about 48.8 grams) (total weight about 190 grams) in an 8 oz. jar at 23° C. for 1 minute, then placing the jar in a foam insulated 32 oz. can. The temperature and viscosity were monitored until the viscosity reached 100,000 mPa.s.

100° C. or 123° C. Hot Plate Scratch Test

Two (2) minutes after the isocyanate was added to the polyol in the above mixture, a portion (about 20 grams) was poured onto a hot plate at 100° C. or 123° C. A wooden applicator stick (Fisher Scientific, Catalog No.: 01-340) was drawn through the mixture until the mixture no longer flows back together after 10 seconds. The time at which the mixture is poured onto the hot plate until it no longer flows back within 10 seconds after scratching with an applicator stick is considered the 100° C. or 123° C. Hot Plate Scratch Test Time, respectively.

40° C. Oven Scratch Test

This test essentially corresponds to the 100° C. or 123° C. scratch test as described above, with the exception being that the sample is placed in an oven where the temperature is 40° C. (instead of on a hotplate at 100° C. or 123° C.).

TABLE 1

|  | Example 1 | Example 2 | Example 3 |
| --- | --- | --- | --- |
| Polyol Blend A (g) | 140 | 140 | 140 |
| Isocyanate A (g) | 48.5 | 48.5 | 48.5 |
| Catalyst A (g) | 1.4 | 0 | 0 |
| Catalyst B (g) | 0 | 0.0036 | 0 |
| Catalyst D (g) | 0 | 0 | 0.006 |
| Wt. % of Metal in Polyol Blend A | 0.0227 (Ni) | 0.00115 (Sn) | 0.00104 (Sn) |
| 100° C. Scratch Test (hot plate; mins) | 4.2 | 3.8 | 6.2 |
| 40° C. Scratch Test (oven; mins) | 130 | 50 | 110 |
| Time to 100,000 mPa · s (mins) | 45 | 30 | 50 |
| Viscosity at 20 mins (mPa · s) | 5,100 | 6,100 | 1,500 |

TABLE 2

|  | Example 4 | Example 5 | Example 6 |
| --- | --- | --- | --- |
| Polyol Blend A (g) | 140 | 140 | 140 |
| Isocyanate A (g) | 48.8 | 48.8 | 48.7 |
| Catalyst C (g) | 0 | 0 | 0.0051 |
| Catalyst D (g) | 0.0069 | 0.0087 | 0 |
| Wt. % Metal in Polyol Blend A | 0.0012% (Sn) | 0.0015 (Sn) | 0.00114 (Sn) |
| 100° C. Scratch Test (hot plate; mins) | 6.2 | 4.5 | 5.8 |
| 40° C. Scratch Test (oven; mins) | 110 | 70 | 100 |
| Time to 100,000 mPa · s (mins) | 46 | 35 | 44 |
| Viscosity at 20 mins (mPa · s) | 1,700 | 3,000 | 2,100 |

TABLE 3

|  | Example 7 | Example 8 | Example 9 |
| --- | --- | --- | --- |
| Polyol Blend A (g) | 140 | 140 | 140 |
| Isocyanate A (g) | 48.5 | 48.8 | 48.5 |
| Catalyst A (g) | 1.4 | 0 | 0 |
| Catalyst D (g) | 0 | 0.0087 | 0 |
| Catalyst E (g) | 0 | 0 | 0.1215 |
| Wt. % Metal in Polyol Blend A | 0.0227 (Ni) | 0.00149 (Sn) | 0.00156 (Sn) |
| 123° C. Scratch Test (hot plate; mins) | 2.0 | 2.5 | 2.5 |
| 40° C. Scratch Test (oven; mins) | 110 | 55 | 50 |
| Time to 100,000 mPa · s (mins) | 45 | 33 | 25 |
| Viscosity at 20 mins (mPa · s) | 4,900 | 3,900 | 18,800 |

Comparing Example 1 and 7 with the other examples shows how much less tin catalyst is necessary to provide a polyurethane composition that cures within about 6 minutes at 100° C. (a common curing cycle in this application)

compared to the delayed action nickel catalyst. Comparing Example 9 with Examples 2, 3, 4, 5, 6 and 8 illustrates the delayed action character compared to a standard polyurethane tin catalyst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane backing or an air frothed foam on a substrate comprising the steps of:
    a) mixing an aromatic polyisocyanate and a polyol mixture in the presence of a catalyst to form a reaction mixture, wherein said catalyst corresponds to the general structure:

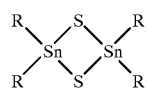

wherein:
    each R: independently represents a linear or branched $C_1$ to $C_{24}$ alkyl group, or a cyclic group containing from 3 to 24 carbon atoms;
    b) applying said reaction mixture to a substrate; and
    c) curing said reaction mixture to form a polyurethane backing or an air frothed foam on the substrate.

2. The process of claim 1, wherein each R independently represents a linear or branched $C_1$ to $C_4$ alkyl group.

3. The process of claim 1, wherein each R independently represents a linear or branched $C_5$ to $C_{16}$ alkyl group, or a cyclic group containing from 5 to 16 carbon atoms.

4. The process of claim 1, wherein each R independently represents a linear or branched $C_8$ to $C_{12}$ alkyl group, or a cyclic group containing from 8 to 12 carbon atoms.

5. The process of claim 1, wherein each R independently represents a methyl, a butyl, an octyl or a dodecyl group.

6. The process of claim 1, wherein the polyisocyanate comprises polymethylene poly(phenylisocyanate) having a functionality of less than about 2.5, an isocyanate group content of about 25 to 30%, a urethane group content of about 2 to 6%, and a monomer content of up to about 75% by weight.

7. The process of claim 5, wherein the monomer content of the polymethylene poly(phenylisocyanate) comprises from about 5 to 55% by weight of the 4,4'-isomer of diphenylmethane diisocyanate, and up to about 50% by weight of the 2,2'- and 2,4'-isomers of diphenylmethane diisocyanate, based on the total monomer content.

8. The process of claim 1, wherein the polyisocyanate comprises polymethylene poly(phenylisocyanate) having a functionality of about 2.15, an isocyanate group content of about 27.5%, and contains about 48% by weight of 4,4'-diphenylmethane diisocyanate, about 10% by weight of 2,2'- and 2,4'-diphenylmethane diisocyanate, about 18% by weight higher ring homologues of the MDI series, and the remainder being the adduct of 4,4'-diphenylmethane diisocyanate with tripropylene glycol such that the urethane group concentration of the mixture is about 4.2%.

9. The process of claim 1, wherein the polyisocyanate comprises a polymethylene poly(phenylisocyanate) having an average functionality of about 2, an isocyanate group content of about 27.3%, and containing about 46% 4,4'-diphenylmethane diisocyanate, about 1% by weight of 2,2'- and 2,4'-diphenylmethane diisocyanate, about 28% by weight of higher ring homologues of the MDI series, and the remainder being the adduct of 4,4'-diphenylmethane diisocyanate with tripropylene glycol such that the urethane group concentration of the mixture is about 4.2%.

10. The process of claim 1, wherein the polyol mixture comprises at least one polyether polyol having a molecular weight of from 500 to 10,000 and containing from 1 to 12 isocyanate-reactive hydrogen atoms.

11. The process of claim 10, wherein said polyether polyols have molecular weights of from about 800 to about 6,000 and functionalities of from about 1.5 to about 4.0.

12. The process of claim 10, wherein said polyether polyol comprises at least one copolymer polyol containing up to about 50% by weight of styrene-acrylonitrile (SAN), based on the total weight of the copolymer polyol.

13. The process of claim 11, wherein said polyether polyols have functionalities of from about 2.0 to about 3.0.

14. The process of claim 10, wherein said polyol mixture additionally comprises at least one chain extender having a molecular weight of less than 500 and an average functionality of from 1.0 to 3.0.

15. The process of claim 14, wherein said chain extender comprises diethylene glycol, triethylene glycol, dipropylene glycol, tripropylene glycol and mixtures thereof.

16. The process of claim 10, wherein a blowing agent comprising water is present in an amount such that there is from 0.2 to 4% by weight of water, based on the total weight of the polyol component.

17. The process of claim 16, wherein water is present in an amount such that there is from 0.5 to 2% by weight of water, based on the total weight of the polyol component.

18. The process of claim 1, wherein said catalyst is selected from the group consisting of: 2,2,4,4-tetrakis-(methyl)-1,3,2,4-dithiadistannetane; 2,2,4,4-tetrakis-(1-butyl)-1,3,2,4-dithiadistannetane; 2,2,4,4-tetrakis-(1-octyl)-1,3,2,4-dithiadistannetane; 2,2,4,4-tetrakis-(1-dodecyl)-1,3,2,4-dithiadistannetane; and mixtures thereof.

19. A process for the production of air frothed foam comprising
    (a) mixing an aromatic polyisocyanate and a polyol mixture in the presence of a catalyst to form a reaction mixture, wherein said catalyst corresponds to the general structure:

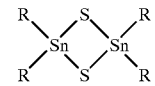

wherein:
    each R: independently represents a linear or branched $C_1$ to $C_{24}$ alkyl group, or a cyclic group containing from 3 to 24 carbon atoms;
    (b) applying said reaction mixture to a coated release paper;
    (c) curing said reaction mixture to form the air-frothed foam on the release paper; and
    (d) removing the release paper.

* * * * *